US010853992B1

(12) United States Patent
Zhu

(10) Patent No.: US 10,853,992 B1
(45) Date of Patent: Dec. 1, 2020

(54) SYSTEMS AND METHODS FOR DISPLAYING A VIRTUAL REALITY MODEL

(71) Applicant: Ke.com (Beijing) Technology Co., Ltd., Beijing (CN)

(72) Inventor: Yi Zhu, Beijing (CN)

(73) Assignee: KE.COM (BEIJING) TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/909,993

(22) Filed: Jun. 23, 2020

(30) Foreign Application Priority Data

Nov. 20, 2019 (CN) .......................... 2019 1 1144124

(51) Int. Cl.
| | |
|---|---|
| *G06T 15/20* | (2011.01) |
| *G06T 15/40* | (2011.01) |
| *G06Q 50/16* | (2012.01) |
| *G06F 30/13* | (2020.01) |

(52) U.S. Cl.
CPC ............ *G06T 15/20* (2013.01); *G06Q 50/16* (2013.01); *G06T 15/40* (2013.01); *G06F 30/13* (2020.01); *G06T 2200/04* (2013.01)

(58) Field of Classification Search
None
See application file for complete search history.

(56) References Cited

U.S. PATENT DOCUMENTS

| | | | | |
|---|---|---|---|---|
| 9,836,885 | B1 * | 12/2017 | Eraker | ............... G06F 3/04815 |
| 2019/0371079 | A1 * | 12/2019 | Du | ....................... G06T 19/003 |

FOREIGN PATENT DOCUMENTS

| | | | |
|---|---|---|---|
| CN | 107957775 A | | 4/2018 |
| CN | 108765583 A | * | 11/2018 |
| CN | 108765583 A | | 11/2018 |
| CN | 108920037 A | | 11/2018 |

OTHER PUBLICATIONS

First Office action issued in related Chinese Application No. 201911144124.6, dated Jul. 6, 2020, 19 pages.

* cited by examiner

*Primary Examiner* — Yi Wang
(74) *Attorney, Agent, or Firm* — Bayes PLLC

(57) ABSTRACT

Systems and methods for displaying a three-dimensional (3D) model of a real estate property are disclosed. An exemplary system may include a display device, a memory storing computer-readable instructions and at least one processor. The processor may execute the computer-readable instructions to perform operations. The operations may include determining a field of view (FOV) of a virtual observer of the 3D model based on a view point of the virtual observer in the 3D model. The FOV may cover a subset of the 3D model. The operations may also include determining, based on a floor plan corresponding to the 3D model, feature information of a functional space that at least partially fall within the FOV or connect to the subset of the 3D model covered by the FOV. The operations may further include controlling the display device to display the subset of the 3D model along with the feature information.

18 Claims, 12 Drawing Sheets

SYSTEMS AND METHODS FOR DISPLAYING A VIRTUAL REALITY MODEL

CROSS-REFERENCE TO RELATED APPLICATION

The present application claims the benefits of priority to Chinese Application No. 201911144124.6, filed on Nov. 20, 2019, the entire contents of which are expressly incorporated herein by reference.

TECHNICAL FIELD

The present application relates to virtual reality (VR) technologies. More specifically, the present application relates to systems and methods for displaying information in a three-dimensional (3D) model of a real estate property in a VR mode.

BACKGROUND

Conventional real estate sales rely on distribution of paper pamphlets and advertisement through newspaper and other paper-based media channels. These off-line advertising methods suffer from low efficiency and a limited customer base. Promoting real estate sales on-line has become popular thanks to the proliferation of Internet and network-connected mobile devices. Real estate information augmentation services may collect for-sale information and distribute such information to subscribers through mailing list or publish the information on websites or mobile app portals. While the on-line approach improves the timeliness and reaches a larger audience, the contents delivered on-line remain largely the same as their off-line counterparts. For example, a typical on-line real estate advertisement material includes a set of photos of the subject property and some textual descriptions. In order to gain more detailed knowledge about the property, such as specific parts not covered or insufficiently depicted by the photos, a visit to the property would normally be required. In addition, the textual descriptions are often provided in the form of a laundry list, lacking context to specific features of the underlying real estate property.

Embodiments of the present disclosure improve the user experience in exploring and virtually touring real estate properties by displaying a 3D model of a real estate property enriched by information showcasing various features of the real estate property, thereby providing contextual information in an intuitive way.

SUMMARY

In one aspect, a system for displaying a 3D model of a real estate property is provided. The system may include a display device configured to display the 3D model, a memory storing computer-readable instructions, and at least one processor communicatively coupled to the display device and the memory. The computer-readable instructions, when executed by the at least one processor, may cause the at least one processor to perform operations. The operations may include determining a field of view (FOV) of a virtual observer of the 3D model based on a view point of the virtual observer in the 3D model. The FOV may cover a subset of the 3D model. The operations may also include determining, based on a floor plan corresponding to the 3D model, feature information of a functional space. The functional space may at least partially fall within the FOV or connect to the subset of the 3D model covered by the FOV. The operations may further include controlling the display device to display the subset of the 3D model along with the feature information.

In another aspect, a method for displaying a 3D model of a real estate property is provided. The method may include determining, by at least one processor, an FOV of a virtual observer of the 3D model based on a view point of the virtual observer in the 3D model. The FOV may cover a subset of the 3D model. The method may also include determining, by the at least one processor, feature information of a functional space based on a floor plan corresponding to the 3D model. The functional space may at least partially fall within the FOV or connect to the subset of the 3D model covered by the FOV. The method may further include displaying, by a display device communicatively coupled to the at least one processor, the subset of the 3D model along with the feature information.

In yet another aspect, a non-transitory computer-readable medium storing computer-readable instructions is provided. The computer-readable instructions, when executed by at least one processor, may cause the at least one processor to perform a method for displaying a 3D model of a real estate property. The method may include determining an FOV of a virtual observer of the 3D model based on a view point of the virtual observer in the 3D model. The FOV may cover a subset of the 3D model. The method may also include determining feature information of a functional space based on a floor plan corresponding to the 3D model. The functional space may at least partially fall within the FOV or connect to the subset of the 3D model covered by the FOV. The method may further include controlling a display device to display the subset of the 3D model along with the feature information.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
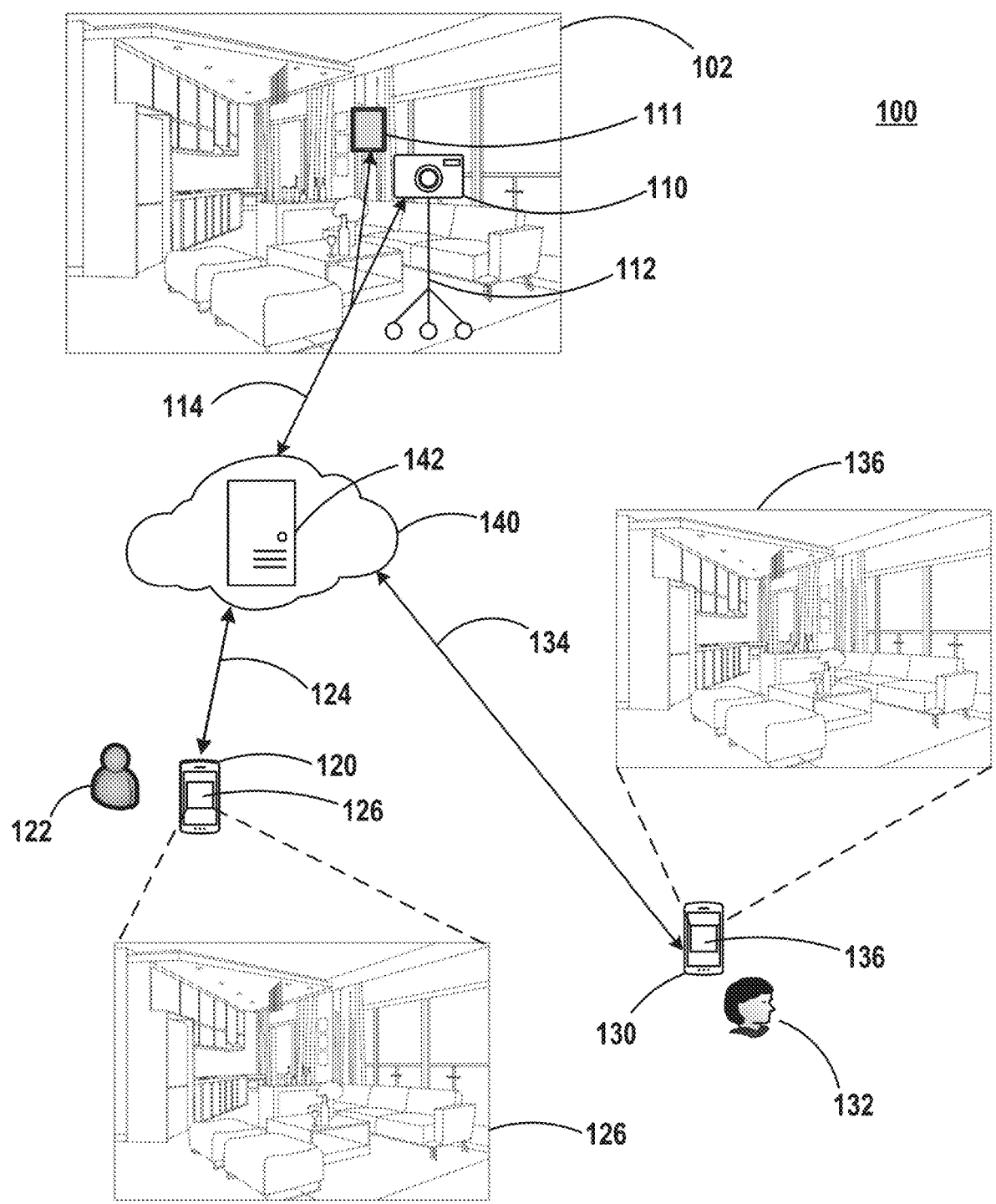
FIG. 1 illustrates an exemplary system for displaying a 3D model of an in-door environment in a VR mode, according to embodiments of the disclosure.

FIG. 1 illustrates an exemplary system 100 for displaying a 3D model of an in-door environment in a VR mode, according to embodiments of the disclosure. System 100 may include a data capturing portion, a data processing portion, and a VR displaying portion. The data capturing portion may include a camera device 110 configured to capture images of an in-door environment 102, which may include enclosed or partially-enclosed space, such as one or more rooms of a residential or commercial real estate property, passenger or cargo space of a vessel (e.g., car, truck, recreational vehicle, trailer, train, ship, plane, etc.), a hall/suite/room of a cultural, political, industrial, or business establishment, etc. In-door environment 102 may include fixtures (e.g., lights, fans, cabinets, closets, etc.), structures (furniture, decorations, etc.), or other features. In some embodiments, in-door environment 102 may include part of a real estate property that may be for sale or rent. For example, the example shown in FIG. 1 depicts a living room of an apartment, house, or office building. Embodiments of the disclosure may create a 3D model of in-door environment 102 to facilitate the provision of a VR tour of the in-door environment. For example, multiple images of in-door environment 102 may be captured, aligned, and combined to recreate or reconstruct a 3D representation of the in-door environment 102. In some embodiments, range, depth, or distance information may also be acquired to aid in creating the 3D model.

In some embodiments, camera device 110 may be configured to capture image data of in-door environment 102. The image data captured by camera device 110 may include static images (e.g., photos), motion images (e.g., videos), 3D images including range, depth, or distance information (e.g., point cloud data), or any combination thereof. For example, camera device 110 may include a specially designed VR camera or 3D camera configured to capture 3D images having range/depth/distance information. In some implementations, camera device 110 may include multiple lenses. One or more of the lenses may be configured to capture the color or intensity information, while one or more other lenses may be configured to capture the range/depth/distance information. In some implementations, camera device 110 may capture two-dimensional (2D) photos (e.g., including color/intensity information) and/or videos using one or more lenses, and extract 3D information from the 2D photos/videos. In some implementations, camera device 110 may capture 2D and/or 3D images at different shooting angles and/or shooting positions. At any one shooting angle or shooting position, camera device 110 may use different image capturing parameters such as different apertures (e.g., f-stops/t-stops), shutter speeds, exposures, focal distances, FOVs, etc. to capture multiple images or multiple sets of images.

The color/intensity information and range/depth/distance information may be stored locally in a memory of camera device 110, transmitted to an accompanying mobile device 111 located in the proximity to camera device 110, and/or streamed to a remote server, such as a server 142 located in a cloud computing service 140, which will be discussed in greater detail below. For example, when mobile device 111 is used, image data captured by camera device 110 may be transmitted to mobile device 111, where the image data may be preprocessed, including, for example, aligning and/or combining point cloud data captured at different shooting angles or shooting positions, adding one or more feature points such as those on windows or mirrors, and conditioning the image data for transmission, such as streaming, dividing into packets, and/or compressing the image data.

In some embodiments, camera device 110 may include a camera not specifically designed to acquire 3D image data. For example, a general-purpose digital camera, a camera equipped on a mobile device (e.g., a smart phone camera, a tablet camera, a laptop camera, etc.), a webcam, an action/sports camera, a panorama or 360-degree camera, or the like, may be used as camera device 110. In this case, images captured by camera device 110 may be aligned and combined based on feature recognition, image registration, machine learning, or other suitable techniques to convert multiple patches of 2D images into a 3D model.

In some embodiments, camera device 110 may include, separate from the image capturing device, a range device such as a light-based sensor (e.g., infra-red, laser, etc.) to acquire range/depth/distance information, which may be associated with 2D images captured by camera device 110 to create a 3D model.

As shown in the example of FIG. 1, camera device 110 may be installed on a stand 112. In some embodiments, stand 112 may include a tripod or similar supporting structures. Camera device 110 may be coupled to stand 112 through mounting, screwing, magnetically attaching, or any suitable mechanism to physically associate with stand 112.

In some embodiments, camera device 110 may be rigidly associated with stand 112. For example, the connection between camera device 110 and stand 112 may not allow significant movement of camera device 110 relative to stand 112. In some embodiments, camera device 110 may be flexibly associated with stand 112. For example, camera device 110 may be connected to stand 112 via a ball head, pan head, gimbal, CV-joint, track, slider, etc., to allow movement (e.g., tilt, pan, linear motion, or the like) of camera device 110 relative to stand 112. In some embodiments, motion of camera device 110 may be manually or remotely controlled by an operator. In some embodiments, motion of camera device 110 may be automatically controlled by a motorized mechanism and may be based on a predetermined routine or feedback from the captured information.

In some embodiment, stand 112 may be equipped with a motion mechanism to move around. For example, stand 112 may include wheels or similar structures to allow movement within in-door environment 102. Stand 112 may be motorized to propel itself. For example, stand 112 may be mounted on or integrated with a motorized base, cart, or robotic platform. In some embodiments, the motion of stand 112 may be controlled by an operator. In some embodiments, the motion of stand 112 may be automatically controlled based on a predetermined routine or feedback from the captured information.

In some embodiments, stand 112 may be omitted. For example, camera device 110 may be placed directly on any suitable surface or held by a user during an image capturing process.

The captured image data of in-door environment 102 may be processed by the data processing portion of system 100. In some embodiments, the data processing portion may include a cloud computing service (also referred to as a cloud service or simply a cloud) 140 comprising one or more servers 142 (hereinafter collectively referred to as server 142). Image data captured by camera device 110 may be transmitted to cloud 140 via a communication channel 114. In some embodiments, communication channel 114 may include a wired or physical connection, such as a data cable, a broadband connection, a card reader, etc. In some embodiments, communication channel 114 may include a wireless connection, such as a wireless local area network (WLAN) connection, a short-range wireless connection (e.g., a Bluetooth connection), a telecommunication link (e.g., using 3G, 4G, or 5G technologies, etc.), a satellite communication link, or the like. In some embodiments, when mobile device 111 is used to process or preprocess the image data captured by camera device 110, mobile device 111 may be part of the data processing portion. In this case, communication channel 114 may be between mobile device 111 and cloud 140 in addition to or instead of between camera device 110 and cloud 140.

Server 142 may include data processing devices to process the image data received from camera device 110 and/or mobile device 111. For example, the image data may include multiple images of in-door environment 102 captured at multiple locations and/or multiple shooting angles. The multiple images may include 2D high-definition color photos, sometimes with multiple exposure levels or other image capturing parameters, of features in the in-door environment 102. The multiple images may also include or be associated with 3D range data (e.g., 3D point cloud data) and/or geographical information (e.g., GPS information) of in-door environment 102. Based on the image data, server 142 may map the features contained in the images as well as image textures and details to a 3D model representing the in-door environment 102 using techniques such as automatic model creation, intelligent hole filling, automatic data extraction, and high-dynamic range (HDR) optimization. In this way, in-door environment 102 can be reconstructed in virtual reality to allow users to explore, examine, and experience the features of in-door environment 102 in high fidelity without being physically present therein. In some embodiments, part or all of the data processing may be performed by mobile device 111. For example, mobile device 111 and server 142 may work in tandem to process the image data captured by camera device 110.

Viewing or touring the reconstructed in-door environment 102 can be accomplished through various ways, such as using a terminal device. For example, as shown in FIG. 1, a user 122 may use a terminal device 120 to view or virtually tour a VR version of in-door environment 102 displayed on terminal device 120. Hereinafter, the VR version is referred to as a VR environment 126. Terminal device 120 may include various devices, such as a mobile phone, a tablet, a laptop or desktop computer, a VR goggles, a pair of VR glasses, a VR headset or helmet, a TV or other forms of display devices, etc. In some embodiments, terminal device 120 may communicate with cloud 140 to exchange information about displaying VR environment 126. For example, data related to VR environment 126, such as the 3D model of in-door environment 102, color information, texture information, spatial relationship among various features/objects, and one or more default view points, view angles, and/or filed of views may be transmitted from cloud 140 to terminal device 120 via a communication channel 124. User 122 may follow or manipulate the view point, view angle, and field of view in the VR environment 126 to explore various features, for example to virtually "move" along a route to change the view point, pan/tilt the view angle, and zoom in/out to change the field of view. These manipulations may be fed back to cloud 140 via communication channel 124 to update cloud 140 about the content of VR environment 126 displayed on terminal device 120 and/or to request additional information for displaying VR environment 126 on terminal device 120. Communication channel 124 may include any suitable wired or wireless connections between cloud 140 and terminal device 124, such as a broadband connection (e.g., via WLAN, LAN, etc.), a short-range communication link such as a Bluetooth connection, a telecommunication link (e.g., using 3G, 4G, or 5G technologies, etc.), a satellite communication link, or the like.

VR environment 126 displayed on terminal device 120 may be enriched with various enrichment data. For example, audio description or guidance (referred to as audio guide) may be added to VR environment 126 to improve the user experience. The audio guide may include a recorded voice guidance to introduce features of in-door environment 102, background information, or other information to assist user 122 in understanding the features or characteristics of in-door environment 102. In another example, video demonstration may be provided to showcase certain features displayed in VR environment 126. In yet another example, one or more spatial operations altering the view of the VR environment 126 may be added to direct the user's attention to specific aspects of VR environment 126. Exemplary spatial operations may include panning, tilting, zooming, sliding or moving in any suitable manner, etc. In yet another example, feature information may be dynamically displayed along with the underlying features, such as the dimensions and/or the square footage of a room, an orientation of a balcony, the distance between two walls, etc. These multimedia contents enrich the VR environment 126 by engaging user 122 with additional layers of interactions, thereby improving the user experience.

Enrichment data such as audio description, video demonstration, and spatial operations altering the view of the VR environment 126 may be added by a user 132. In some embodiments, user 132 may have a role falling within a predetermined authorization group, such as a realtor, an owner or manager of a real estate property, or the like. User 132 may operate a terminal device 130 to create enrichment data or upload pre-created enrichment data to cloud 140. For example, terminal device 130 may display a 3D VR environment 136 (also referred to as VR environment 136 or environment 136 for simplicity) that may be similar to VR environment 126 but may include additional interface elements configured for creating or adding enrichment data.

Terminal device 130 may communicate with cloud 140 via communication channel 134, which may be similar to communication channel 124. Enrichment data created or uploaded by user 132 may be transmitted to cloud 140 via communication channel 134. After receiving the enrichment data, cloud 140, through server 142, may update the 3D model of in-door environment 102 stored thereon by adding the enrichment data, and provide the updated VR environment 126 to terminal device 120.

When user 122/132 is navigating through VR environment 126/136, a virtual observer (also referred to as a user indicator) indicating a virtual user observing VR environment 126/136 (e.g., the 3D model of in-door environment 102) within VR environment 126/136 may be used to determine the field of view depicted on terminal device 120/130. It is noted that the virtual observer may or may not be visible in VR environment 126/136. In some embodiments, the virtual observer may be represented by a point position within VR environment 126/136 simulating the position where user 122/132 is virtually located within VR environment 126/136 and/or a view direction toward which user 122/132 faces. The point position of the virtual observer may coincide with the view point at which the view of the VR environment 126/136 displayed on terminal device 120/130 is perceived or observed. In some embodiments, the point position may correspond to the location at which the image data of in-door environment 102 is captured. For example, camera device 110 may be placed at a spatial location within in-door environment 102 to capture image data, which may be used to reconstruct the 3D model of in-door environment 102. When the 3D model is displayed to user 120/130 in the form VR environment 126/136, user 120/130 may be presented with a view of the VR environment as if the user is standing at the same spatial location of camera device 110 and to observe what camera device 110 can capture. In some embodiments, whether the virtual observer is within VR environment 126/136 or not may indicate whether user 122/132 engages or experiences VR environment 126/136.

Figure 2:
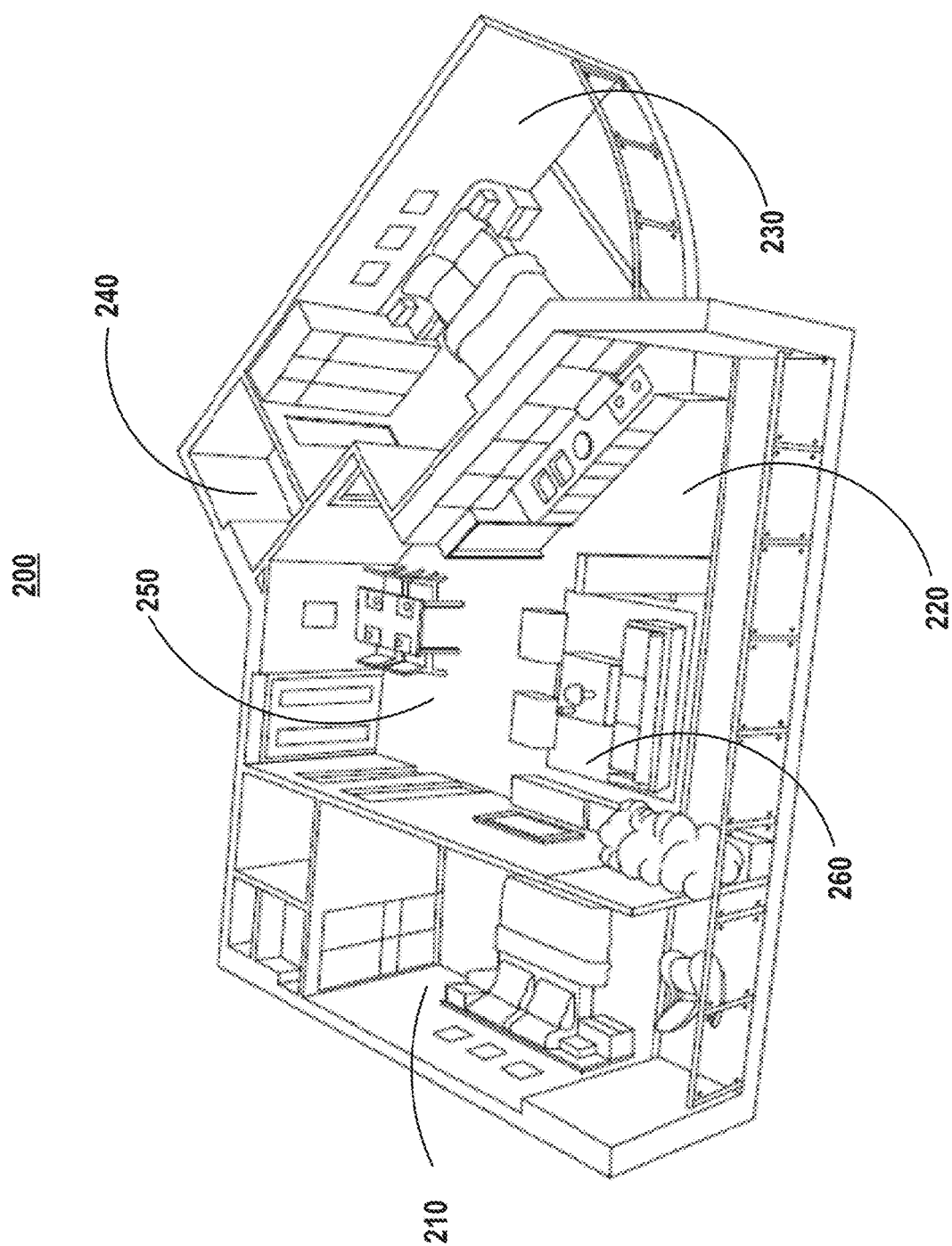
FIG. 2 illustrates an exemplary 3D model for creating a VR environment, according to embodiments of the disclosure.

FIG. 2 illustrates an exemplary 3D model 200 for creating a VR environment (e.g., 126/136), according to embodiments of the disclosure. As shown in FIG. 2, 3D model 200 may simulate or represent a residential unit, such as an apartment or a house floor. It is noted that 3D model 200 is not limited to the example shown in FIG. 2. Rather, 3D model 200 may include a representation of any in-door space or environment. Referring to FIG. 2, 3D model 200 may include one or more functional spaces, such as 210, 220, 230, 240, 250, and 260. As used herein, a functional space refers to an enclosed or partially enclosed space that is associated with a particular function. In some cases, a functional space may correspond to a room. For example, functional space 210 may correspond to a first bedroom, and functional space 230 may correspond to a second bedroom. In some cases, a functional space may correspond to an enclosed or partially enclosed space within or adjacent to a room. For example, functional space 240 may correspond to a closet. In some cases, a function space may correspond to an area that is generally used for a specific purpose. For example, functional space 220 may correspond to a kitchen area, functional space 250 may correspond to a dining area, and functional space 260 may correspond to a living room. Although functional spaces 220, 250, and 260 may share the same room (e.g., an enclosed area), they may be considered as different functional spaces due to their different functions.

Figure 3:
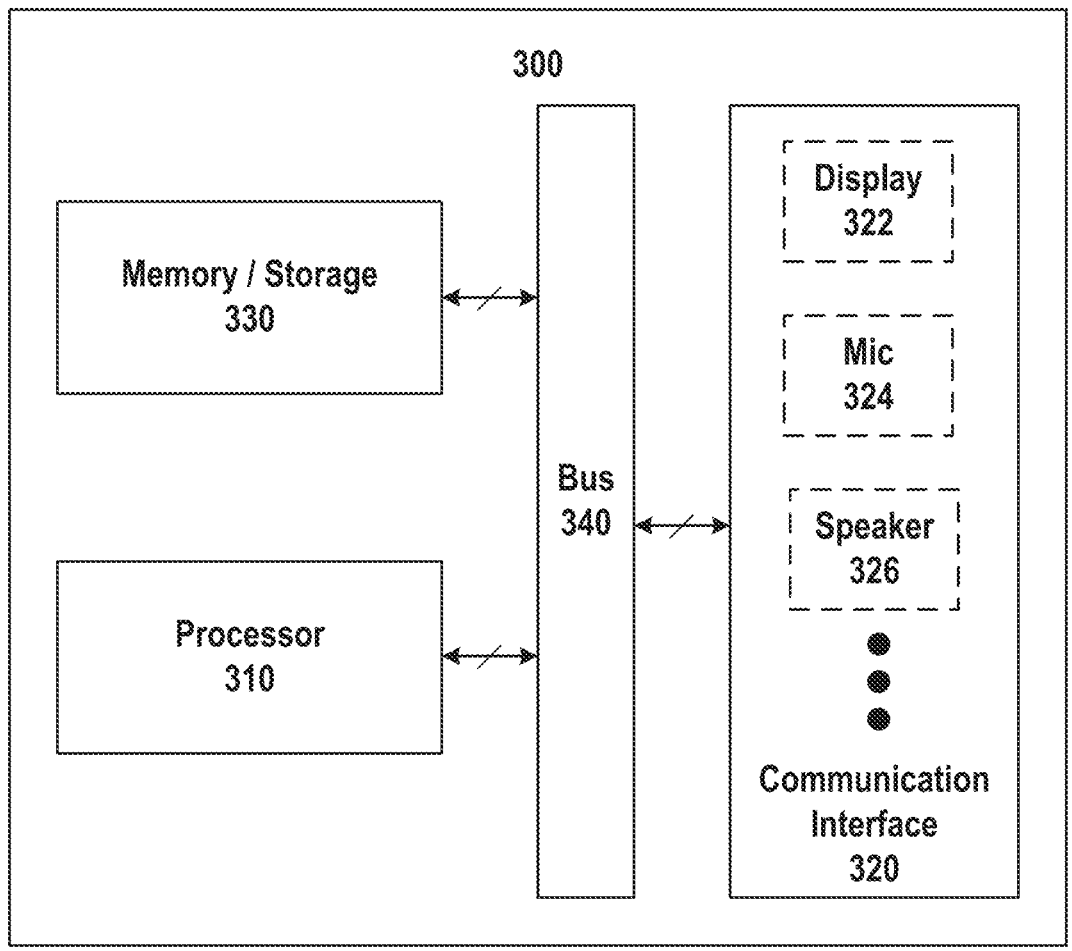
FIG. 3 illustrates a block diagram of an exemplary system for displaying a three-dimensional (3D) model of a real estate property, according to embodiments of the disclosure.

FIG. 3 illustrates a block diagram of an exemplary computer system 300 configured to implement various functions disclosed herein. For example, computer system 300 may be configured as server 142 to create or reconstruct VR environment 126. In another example, computer system 300 may be configured as terminal device 120 or 130 to display or enrich VR environment 126/136. As shown in FIG. 3, computer system 300 may include a processor 310, a communication interface 320, a memory/storage 330, and a data bus 340. Memory/storage 330 may be configured to store computer-readable instructions that, when executed by processor 310, can cause processor 310 to perform various operations disclosed herein. Memory 330 may be any non-transitory type of mass storage, such as volatile or non-volatile, magnetic, semiconductor-based, tape-based, optical, removable, non-removable, or other type of storage device or tangible computer-readable medium including, but not limited to, a ROM, a flash memory, a dynamic RAM, and a static RAM.

Processor 310 may be configured to perform the operations in accordance with the instructions stored in memory 330. Processor 310 may include any appropriate type of general-purpose or special-purpose microprocessors, digital signal processors, microcontrollers, or the like. Processor 310 may be configured as a separate processor module dedicated to performing one or more specific operations disclosed herein. Alternatively, processor 310 may be configured as a shared processor module capable of performing other operations unrelated to the one or more specific operations disclosed herein. In some embodiments, more than one processors 310 may be used to perform operations in a distributed and/or collaborated manner.

Communication interface 320 may be configured to communicate information between computer system 300 and other devices or systems. For example, communication interface 320 may include an integrated services digital network (ISDN) card, a cable modem, a satellite modem, or a modem to provide a data communication connection. As another example, communication interface 320 may include a local area network (LAN) adaptor to provide a data communication connection to a compatible LAN. As a further example, communication interface 320 may include a high-speed network adapter such as a fiber optic network adaptor, 10G Ethernet adaptor, or the like. Wireless links can also be implemented by communication interface 320. In such an implementation, communication interface 320 can send and receive electrical, electromagnetic, or optical signals that carry digital data streams representing various types of information via a network. The network can typically include a cellular communication network, a Wireless Local Area Network (WLAN), a Wide Area Network (WAN), or the like.

Communication interface 320 may also include various I/O devices such as a display 322, a microphone 324, a speaker or speaker module 326, a keyboard, a mouse, a touchpad, a touch screen, a camera, a biosensor, etc. User 122/132 may input data to and/or receive information from terminal device 120/130 through communication interface 320.

Display 322 may be integrated as part of computer system 300 or may be provided as a separate device communicatively coupled to computer system 300. Display 322 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 322 may include a VR goggle, a pair of VR glasses, a VR headset or helmet, etc. which provide immersive VR experience. For example, VR environment 126/136 may be displayed on display 322. In some embodiments, display 322 may be integrated as part of communication interface 320.

Microphone 324 may include any suitable audio input device configured to receive audio signals and convert the audio signals to electrical signals. For example, user 132 may record an audio guide through microphone 324 as part of the enrichment data.

Speaker (or speaker module) 326 may include any suitable audio output device. In some embodiments, speaker 326 may include an audio transducer to convert electrical signals to audio signals. In some embodiments, speaker 326 may take the form of a digital to analog converter to convert digital audio signals to analog signals, which can be further converted to audio signals by a separate audio transducer.

Data bus 340 may include any suitable communication medium configured to facilitate data exchange among components of computer system 300.

Embodiments of the present disclosure enable displaying of feature information along with at least part of the 3D model that falls within the FOV of a virtual observer, thereby providing contextual information to a user. The feature information may include, for example, the type of a functional space, dimension information of a functional space, orientation information of a function space, accessory structure information of a functional space, connectivity information of a functional space, etc. The feature information may be dynamically determined based on the FOV of the virtual observer. For example, the FOV may be mapped to a 2D floor plan to obtain an observable region of the floor plan corresponding to the FOV. The 2D floor plan may contain information of one or more functional space. Such information may be extracted based on the observable region of the 2D floor plan and used to determine the feature information. The feature information may then be displayed according to a display mode corresponding to the feature information. For example, the feature information may be overlaid onto a surface of the 3D model to create a visual impression that the feature information is being shown on top of a corresponding structure within the 3D model.

Figure 4:
FIG. 4 illustrates an exemplary VR environment with feature information, according to embodiments of the disclosure.

FIG. 4 illustrates an exemplary VR environment 400 with feature information, according to embodiments of the present disclosure. VR environment 400 shown in FIG. 4 may be displayed on terminal device 120 and/or 130 and represent part of a living room of a residential unit (e.g., an apartment). In some embodiments, VR environment 400 may be constructed based on a 3D model of the residential unit (e.g., a 3D model similar to that shown in FIG. 2). The portion of VR environment 400 shown in FIG. 4 may correspond to an FOV of a virtual observer located at a view point in the 3D model. In some embodiments, 2D images may be patched onto the surface of the 3D model to enhance the details and/or textures. As discussed above, VR environment 400 may be displayed on terminal device 120 to facilitate user 122 to conduct a VR tour of the residential unit. In some embodiments, the virtual observer may be used as a spatial indicator to determine the FOV, which in turn may determine which portion or subset of the 3D model should be displayed on terminal device 120. For example, the FOV shown in FIG. 4 may result from the virtual observer being located at a certain view point in the living room and facing toward the window. The location of the view point and the direction of observation of the virtual observer may determine the FOV of the virtual observer.

As shown in FIG. 4, feature information may be displayed in VR environment 400 along with the portion of the 3D model covered by the FOV. For example, feature information 410 may include the type of the room (e.g., "living room"), dimension information such as the square footage of the room (e.g., "about 300 square feet"), orientation information of the room (e.g., "facing east"), and accessory structure information of the room (e.g., "has a balcony"). In another example, feature information 420 may provide the height of the room (e.g., "about 9 feet") along with feature information 422 as an indication of the height. In yet another example, feature information 430 may provide the width (or length) of the room (e.g., "about 12 feet") along with feature information 432 as an indication of the width (or length). Feature information 440, 450, and 460 may provide connectivity information of the room. For example, feature information 440 may indicate that a balcony is connected to the living room and the balcony is in the forward direction from the view point (e.g., using a forward arrow "^"). Feature information 450 may indicate that a storage room is connected to the living room, also in the forward direction. Feature information 460 may indicate that a kitchen is connected to the living room to the right-hand side (e.g., using an arrow pointing to the right ">"). As shown in FIG. 4, feature information may be displayed along with the respective portion of the 3D model to which the feature information is pertinent. For example, feature information 410 is shown to be displayed on the surface of a wall, creating a visual effect that feature information 410 is floating on the wall. In another example, graphical feature information 422 and 432 are displayed as arrowed lines indicating the dimensions of the room, with textual feature information 420 and 430 attaching to them, respectively. Feature information 440, 450, and 460 are shown to be floating near their respective functional spaces to provide the connectivity information.

Figure 5:
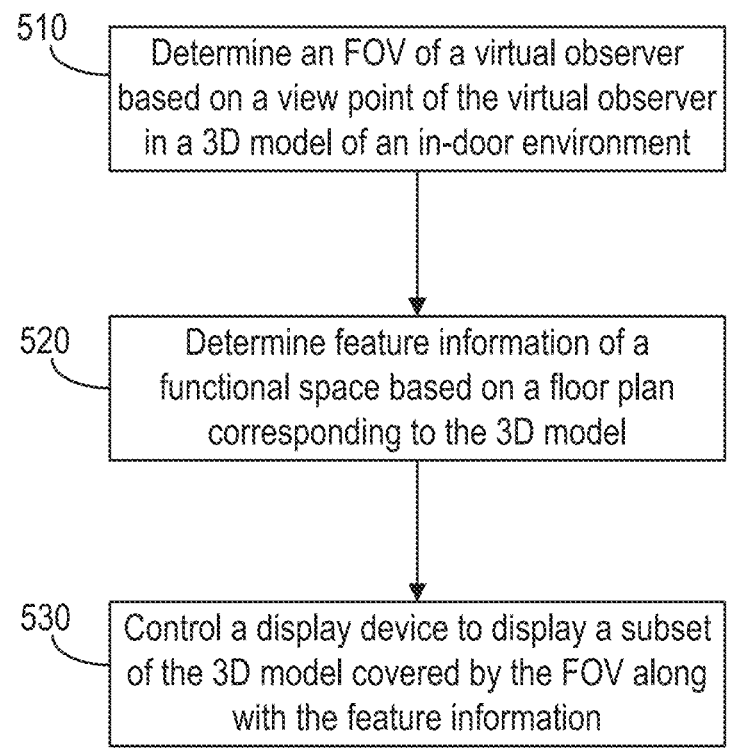
FIG. 5 illustrates a flowchart of an exemplary method for providing feature information to a VR environment to improve user experience, according to embodiments of the disclosure.

FIG. 5 illustrates a flowchart of an exemplary method 500 for providing feature information to a VR environment to improve user experience, according to embodiments of the disclosure. In some embodiments, method 500 may be implemented by server 142. However, method 500 is not limited to that exemplary embodiment and may be implemented by terminal device 120/130 or jointly by server 142 and terminal device 120/130. As discussed above, server 142 and/or terminal device 120/130 may be implemented by computer system 300 (e.g., processor 310). Method 500 may include multiple steps as described below. It is to be appreciated that some of the steps may be optional or can be omitted. Further, some of the steps may be performed simultaneously, or in a different order than that shown in FIG. 5.

In step 510, processor 310 may determine an FOV of a virtual observer based on a view point of the virtual observer in a 3D model of an in-door environment (e.g., in-door environment 102). As discussed above, the 3D model can be constructed by, for example, mobile device 111 and/or server 142, based on information captured by camera 110. In some embodiments, the 3D model may be constructed using a 3D modeling software running on a workstation, a server, or the like. The 3D model may be displayed by a terminal device (e.g., terminal device 120) through a user interface (e.g., on display 322). In some embodiments, a user (e.g., user 122) may set the view point of the virtual observer in the 3D model. For example, the user may set the location of the view point and/or a direction of observation of the virtual observer at the view point. The location of the view point of the virtual observer may represent the position in the 3D model at which the user observes the 3D model. The direction of observation of the virtual observer may represent the viewing direction of the user in the 3D model.

Figure 6:
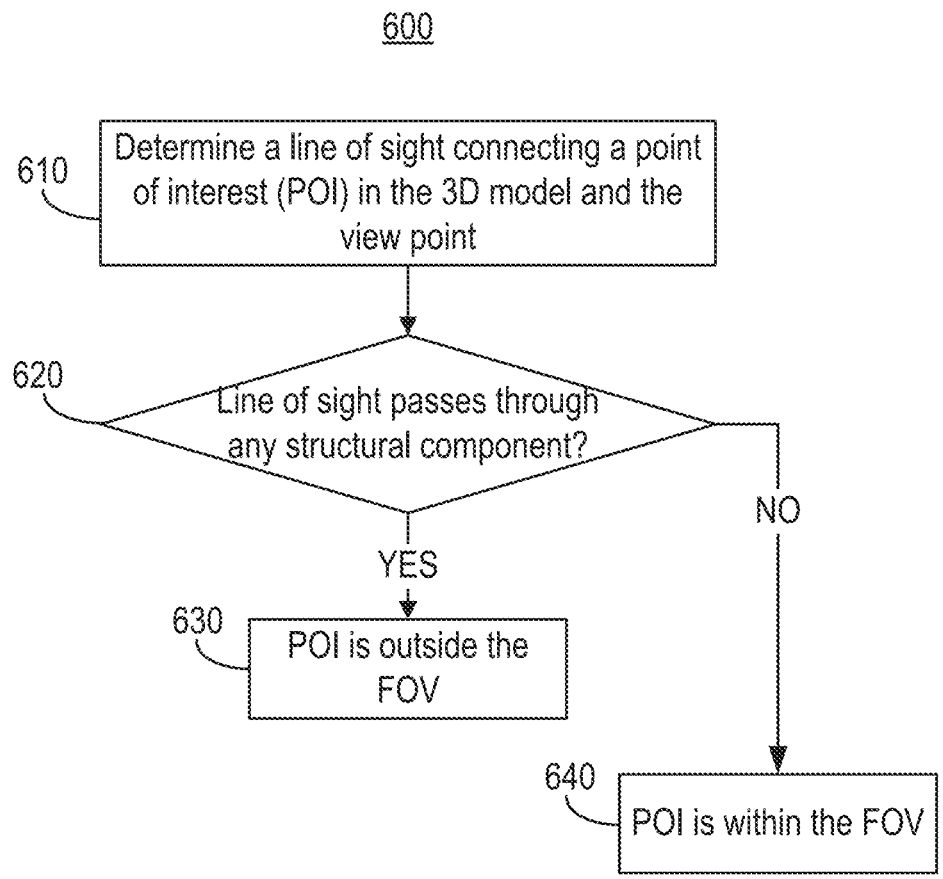
FIG. 6 illustrates a flowchart of an exemplary method for determining a field of view of a virtual observer based on a line of sight testing, according to embodiments of the disclosure.

For the virtual observer located at a given view point and facing a particular direction, the FOV of the virtual observer can be determined. For example, the FOV may be limited by the angular span of human eyesight (e.g., less than 180 degrees in both horizontal and vertical directions). The FOV can also be determined based on the observable points of interest (POIs) in the 3D model. For example, certain POIs may be behind a wall or an opaque structural component such that they are out of view from the view point. FIG. 6 illustrates a flowchart of an exemplary method 600 for determining the FOV based on a line of sight testing, according to some embodiments. Referring to FIG. 6, in step 610, processor 310 may determine aline of sight connecting a POI in the 3D model and the view point of the virtual observer. For example, the POI may be any component of the 3D model, such as a piece of furniture, an appliance, a fixture, a wall, etc. In step 620, processor 310 may determine if the line of sight passes through any structural component of the 3D model. A structure component may include any portion of the 3D model that make up the structure of the model, such as a wall, a door, etc. When the line of sight does not pass through any structure component, method 600 proceeds along the "No" branch of step 620 to step 640, in which processor 310 may determine that the POI is within the FOV. Otherwise, when the line of sight passes through at least one structural component, method 600 proceeds along the "Yes" branch of step 620 to step 630, in which processor 310 may determine that the PO is outside the FOV. In some embodiments, the POIs within the FOV (e.g., viewable by the virtual observer) may collectively form the FOV, which can be displayed as a virtual environment by terminal device 120. In some embodiments, the FOV may cover a subset of the 3D model because certain parts of the 3D model may be out of sight and not within the FOV.

Returning to FIG. 5, in step 520, processor 310 may determine feature information of a functional space based on a floor plan corresponding to the 3D model. In some embodiments, the functional space may at least partially fall within the FOV. For example, when the virtual observer is located within a living room (e.g., an exemplary functional space), the living room may at least partially fall within the FOV of the virtual observer. In another example, when a living room and a bedroom is connected through a door and the line of sight connecting the virtual observer and the bedroom is not blocked, the bedroom may at least partially fall within the FOV of the virtual observer. In some embodiments, the functional space may at least partially connect to the subset of the 3D model covered by the FOV. For example, when a bedroom does not fall within the FOV of the virtual observer, but nevertheless connects to a living room in which at least a subset of the 3D model of the living room is covered by the FOV, feature information of the bedroom can still be determined by virtue of the connection between the bedroom and the living room.

Figure 7A:
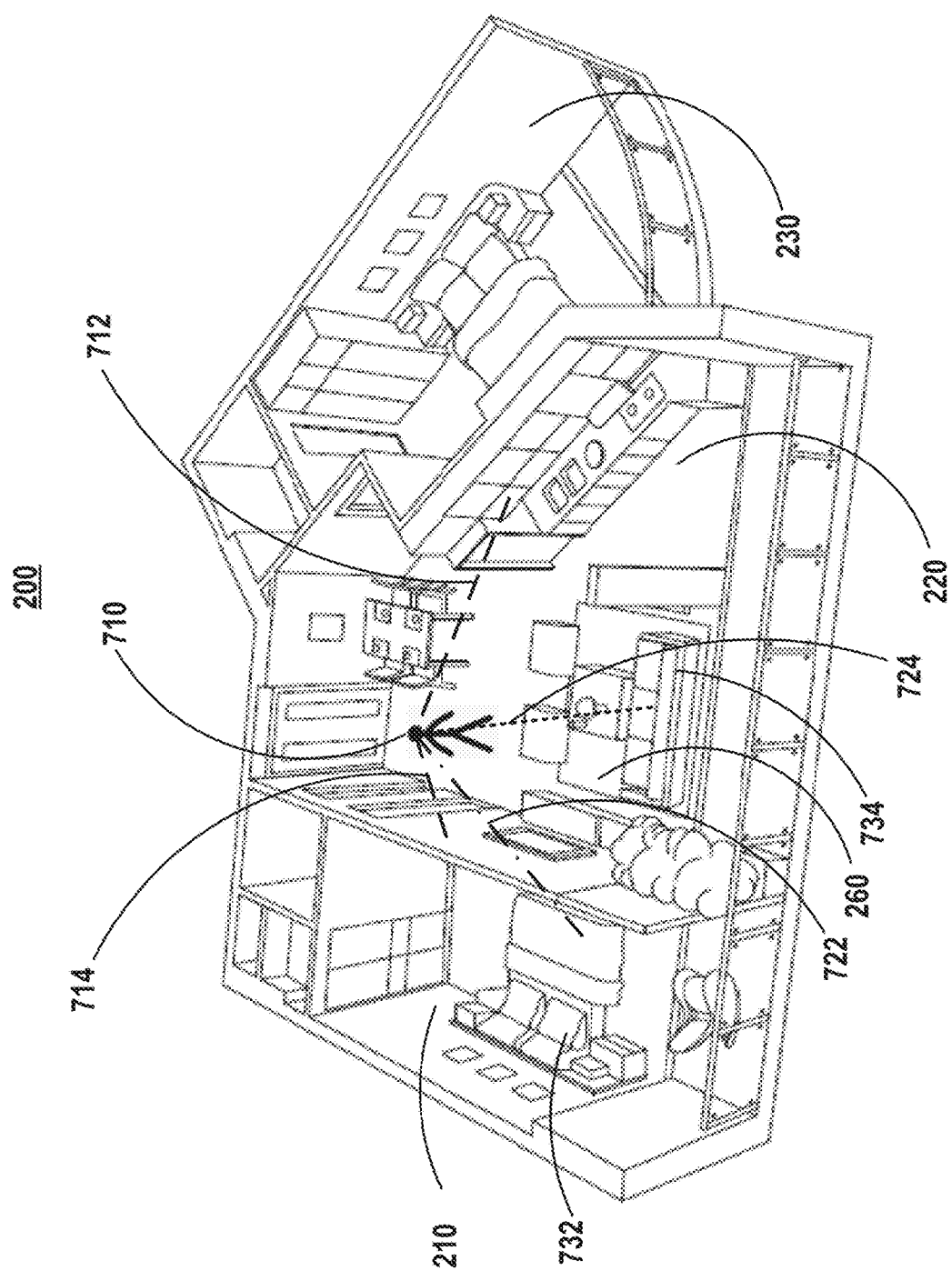
FIG. 7A illustrate an exemplary 3D model of a real estate property, according to embodiments of the disclosure.
Figure 7B:
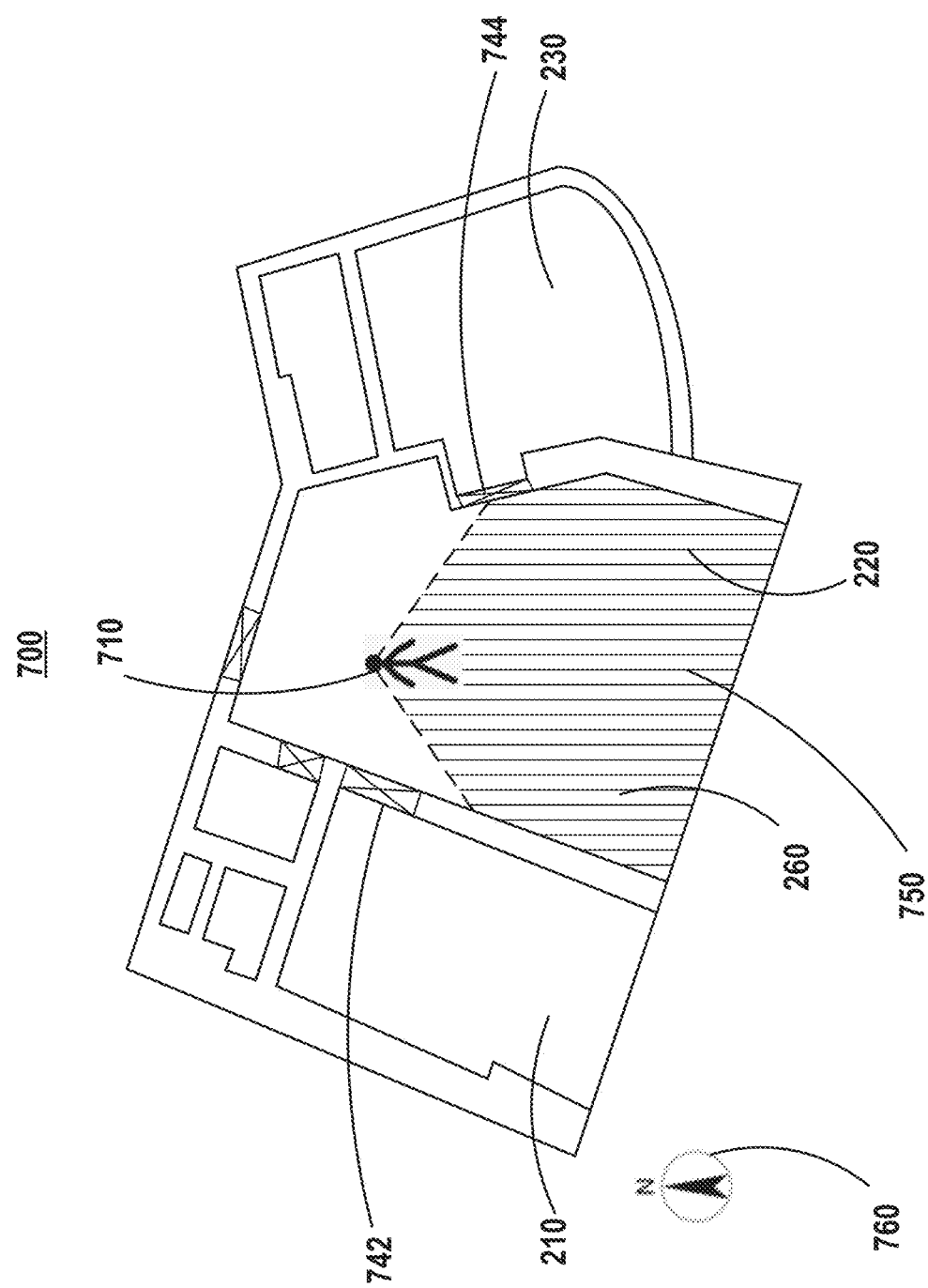
FIG. 7B illustrate an exemplary floor plan corresponding to the 3D model shown in FIG. 7A, according to embodiments of the disclosure.

In some embodiments, feature information of a functional space can be determined based on a floor plan corresponding to the 3D model. FIGS. 7A and 7B illustrate an exemplary 3D model of a real estate property and its corresponding floor plan, respectively, according to some embodiments of the present disclosure. It is noted that the 3D model shown in FIG. 7A is the same as that shown in FIG. 2, but will be described in the context of feature information determination in the following passages. As shown in FIG. 7A, a virtual observer 710 is located at a view point in 3D model 200. In some embodiments, a user may set the view point of virtual observer 710 by, for example, moving virtual observer 710 around 3D model 200. In some embodiments, one or more preset view points may be used as default view points. The user may also set the direction of observation of virtual observer 710, for example, by rotating, tilting, and/or panning virtual observer 710. Based on the location and/or the direction of observation, processor 310 may determine the FOV of virtual observer 710, as discussed above. The FOV may be indicated by an exemplary angular span defined by lines 712 and 714 in FIG. 7A. The portions of the functional space 260 and 220 falling within or covered by the FOV may be displayed as a VR environment for the user to explore.

FIG. 7A also illustrates an example of the line of sight testing discussed above in connection with FIG. 6. As shown in FIG. 7A, to determine whether a POI is with the FOV of virtual observer 710, a line of sight connecting the POI and virtual observer 710 may be used to assess whether the line of sight is blocked by any structural component of 3D model 200. For example, a line of sight 722 connecting virtual observer 710 and a bed 732 in bedroom 210 passes through a wall (e.g., a structural component of 3D model 200) separating living room 260 and bedroom 210. As a result, processor 310 may determine that bed 732 is outside the FOV. In another example, a line of sight 724 connecting virtual observer 710 and a sofa 734 does not pass any structural component of 3D model 200. As a result, processor 310 may determine that sofa 734 falls within the FOV.

The FOV of virtual observer 710 in 3D model 200 may be used to map to a corresponding floor plan for extracting information about one or more functional spaces from the floor plan. FIG. 7B shows an exemplary floor plan 700 corresponding to 3D model 200. In some embodiments, floor plan 700 may be generated based on 3D model 200. For example, a bird view of 3D model 200 may be used as a basis for making floor plan 700. Floor plan 700 may be automatically, semi-automatically, or manually generated. When floor plan 700 is manually generated, 3D model 200 may or may not be used as the basis for making floor plan 700.

Figure 8:
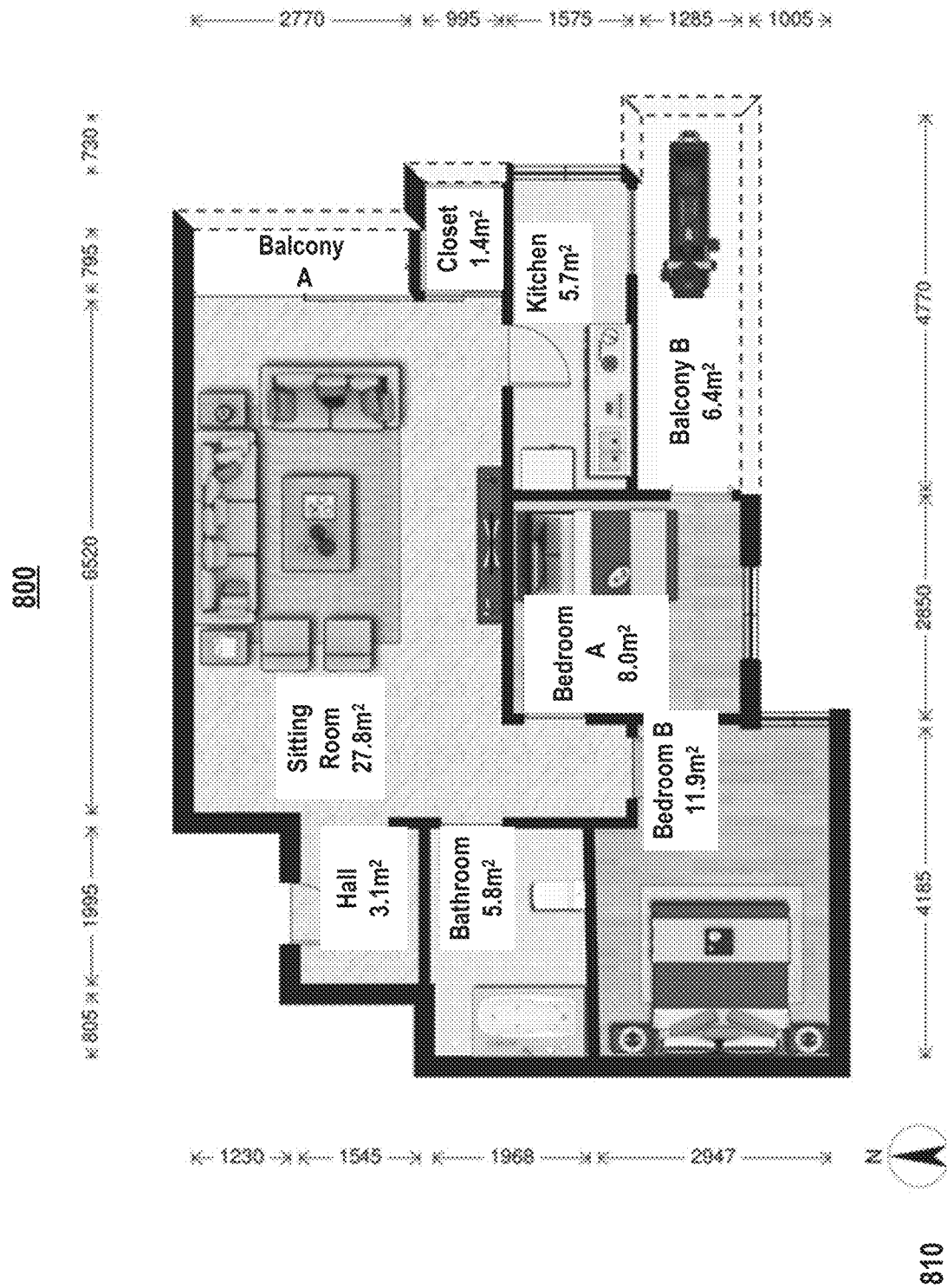
FIG. 8 illustrates another exemplary floor plan, according to embodiments of the disclosure.

A floor plan may include a 2D representation of an underlying real estate property and may include various information relating to the underlying real estate property. For example, FIG. 8 illustrates an exemplary floor plan 800. As shown in FIG. 8, floor plan 800 may include structural information (e.g., walls, doors, windows, etc.), functional information (e.g., room types such as bedroom, bathroom, sitting room, balcony, closet, hall, etc.), dimensional information (e.g., square footage, length, width, etc.), geographical orientation information (e.g., as indicated by a compass legend 810), or the like. Floor plan 800 may be stored in memory/storage 330 and may be accessed by processor 310.

Figure 9:
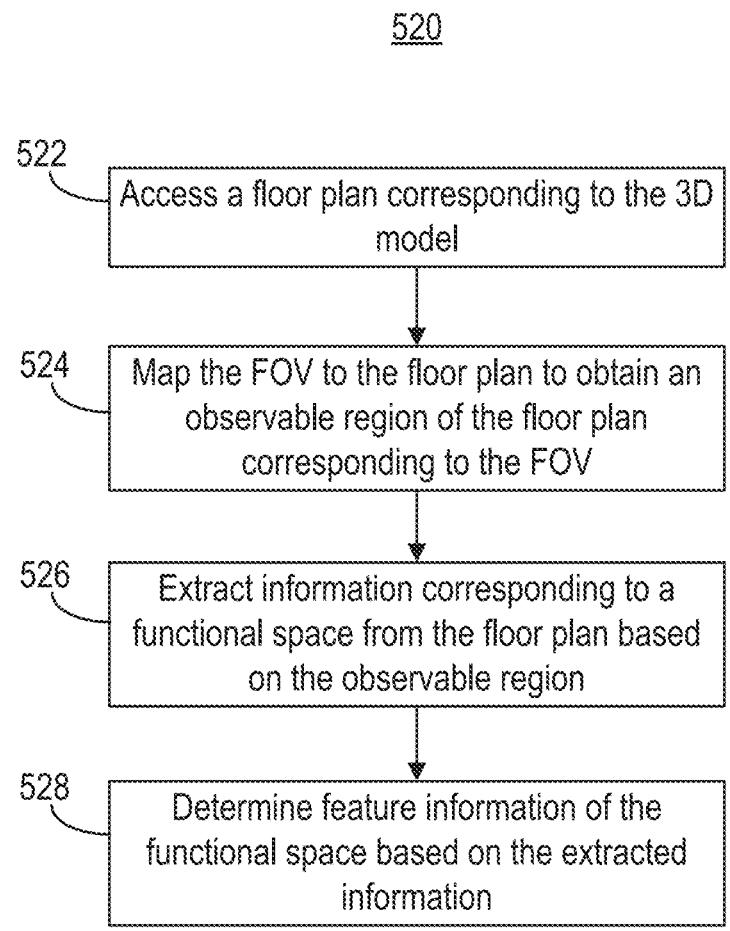
FIG. 9 illustrates a flow chart of an exemplary method for determining feature information based on a floor plan, according to embodiments of the disclosure.

FIG. 9 illustrates a flow chart of an exemplary implementation of step 520, in accordance with some embodiments of the present disclosure. FIG. 9 will be described together with FIG. 7B. In step 522, processor 310 may access a floor plan, such as floor plan 700, corresponding to 3D model 200. As discussed above, floor plan 700 may be stored in memory/storage 330 and accessed by processor 310. In step 524, processor 310 may map the FOV of virtual observer 710 determined in step 510 to floor plan 700 to obtain an observable region of the floor plan corresponding to the FOV. Referring to FIG. 7B, the FOV of virtual observer 710 in 3D model 200 may be mapped to floor plan 700 to obtain an observable region 750 (shown as a shadowed area). Observable region 750 may correspond to the subset of 3D model 200 covered by the FOV.

In some embodiments, floor plan 700 may have a mapping relationship to 3D model 200 or vice versa. For example, floor plan 700 may be mapped to a corresponding 2D plane of 3D model 200, where points in floor plan 700 may be mapped to points in the corresponding 2D plane. In another example, all points in 3D model 200 along a vertical line may be mapped to a corresponding 2D point in floor plan 700. Based on the mapping relationship between 3D model 200 and floor plan 700, a subset of 3D model 200 covered by the FOV of virtual observer 710 may be mapped to a region in floor plan 700, which may be used as the observable region. For example, the mapping may be performed by identifying all points in floor plan 700 that correspond to the points of the subset of 3D model 200 covered by the FOV. The collection of these mapped points in floor plan 700 may be used to determine the observable region.

In step 526, processor 310 may extract information corresponding to a functional space from the floor plan based on the observable region. For example, referring to FIG. 7B, processor 310 may determine that observable region 750 includes one or more functional spaces such as 260 and 220. Processor 310 may then extract information corresponding to functional space 260 and/or 220 from floor plan 700. In another example, processor 310 may determine that observable region 750 connects to one or more functional spaces such as 210 and 230 through doors 742 and 744, respectively. Processor 310 may then extract information corresponding to functional space 210 and/or 230 from floor plan 700. As discussed above, floor plan 700 may include various information of the functional spaces. Such information may be extracted by processor 310 based on the functional spaces related to observable region 750. For example, the extracted information may include the type of a functional space (e.g., bedroom, living room, foyer, kitchen, study, etc.), dimension information of the functional space (e.g., wall dimensions including height, length, etc.; floor dimensions including square footage, length, width, etc.; or the like), orientation information of the functional space (e.g., facing east, west, south, north, etc.), accessory structure information of the functional space (e.g., whether the functional space has an accessory structure such as a window, a balcony, a terrace, a garden, etc. and if so, information of the accessory structure), connectivity information of the functional space (e.g., information indicating that the living room is connected to study, kitchen, foyer, etc.), or the like. Take FIG. 4 for example, when processor 310 determines that the observable region in a floor plan corresponding to the 3D model of FIG. 4 includes a living room, the information extract from the floor plan may include the type of the functional space (e.g., living room), the dimension information (e.g., 300 square feet), and/or accessory structure information (e.g., the living room connects to a balcony, a storage room, and a kitchen).

In step 528, processor 310 may determine feature information of the one or more functional spaces based on the extracted information. As discussed above, the feature information may include information of the functional space at least partially falling within the FOV, such as functional spaces 220 and 260 shown in FIG. 7B. The feature information may also include information of the functional space(s) at least partially connecting to the subset of the 3D model covered by the FOV, such as functional spaces 210 and 230 shown in FIG. 7B. The feature information may also include information about the connectivity between functional spaces. Similar to the information extracted from the floor plan, the feature information may include, for example, the type of a functional space (e.g., bedroom, living room, foyer, kitchen, study, etc.), dimension information of the functional space (e.g., wall dimensions including height, length, etc.; floor dimensions including square footage, length, width, etc.; or the like), orientation information of the functional space (e.g., facing east, west, south, north, etc.), accessory structure information of the functional space (e.g., whether the functional space has an accessory structure such as a window, a balcony, a terrace, a garden, etc. and if so, information of the accessory structure), connectivity information of the functional space (e.g., information indicating that the living room is connected to study, kitchen, foyer, etc.).

Figure 10:
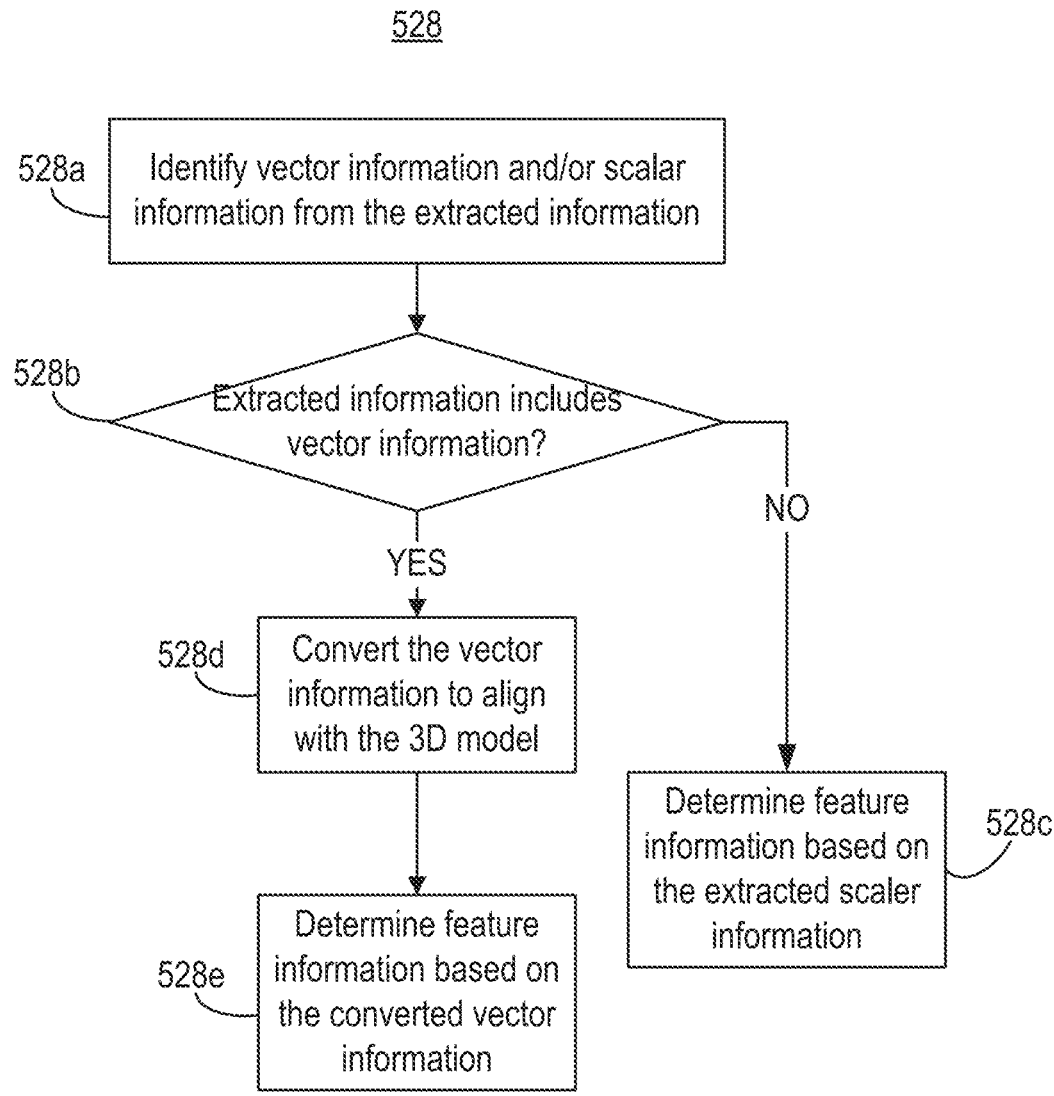
FIG. 10 illustrates an exemplary method for determining feature information based on information extracted from a floor plan, according to embodiments of the disclosure.

FIG. 10 illustrates an exemplary implementation of step 528, in accordance with some embodiments. As shown in FIG. 10, step 528 may be implemented through steps 528a-528e. In step 528a, processor 310 may identify vector information and scalar information from the extracted information. Vector information may include directional information such as the orientation information of a functional space. On the other hand, scalar information may include the type of a functional space, dimension information of the functional space, accessory structure information of the functional space, and connectivity information of the functional space. In step 528b, processor 310 may determine whether the extracted information includes vector information. When the extracted information does not include vector information, step 528 may proceed along the NO branch of step 528b to step 528c, in which processor 310 may determine feature information based on the extracted scalar information. In some embodiments, the extracted scalar information may be used directly as the corresponding feature information. For example, when the extract information includes dimension information (e.g., scalar information) representing the area of the functional space (e.g., 100 square feet), then the square footage information may be directly used as the corresponding feature information.

When the extracted information includes vector information, step 528 may proceed along the YES branch of step 528b to step 528d, in which processor 310 may convert the vector information to align with the 3D model. In some embodiments, the conversion may be performed by multiplying the vector information with a dimensional conversion matrix. The dimensional conversion matrix may be predetermined to convert information between a 3D model and the corresponding floor plan of the same underlying real estate property. The dimensional conversion matrix may represent the relative rotation and/or displacement between the 3D model and the corresponding floor plan. For example, assuming that the orientation information extracted from floor plan 700 is a vector A, and the dimensional conversion matrix is A. Then the corresponding feature information representing the dimension information in 3D model 200 can be determined as B=A·M. In this way, in step 528e, processor 310 may determine feature information based on the converted vector information (e.g., by multiplying with the dimensional conversion matrix).

Returning to FIG. 5, method 500 may proceed to step 530, in which processor 310 may control display device 322 to display a subset of the 3D model covered by the FOV along with the feature information. For example, as shown in FIG. 4, various feature information may be display along with the 3D model, such as on the surface of a wall (e.g., 410), on an appliance (e.g., 460), on a piece of furniture (e.g., 440), or any suitable places that are within the FOV.

In some embodiments, when feature information includes accessory structure information of the functional space, processor 310 may identify an accessory structure based on the accessory structure information. For example, the accessory structure information may include the type of the accessory structure, such as window, balcony, terrace, garden, closet, storage, etc. Based on the accessory structure information, processor 310 may identify the corresponding accessory structure (e.g., window, balcony, terrace, garden, closet, storage). Processor 310 may then determine whether the identified accessory structure is a target accessory structure. For example, a target accessory structure may include those accessory structures exposing to outside, such as a window, a balcony, a terrace, a garden, or the like. When the accessory structure is a target accessory structure, processor 310 may determine the orientation of the target accessory structure based on a floor plan, such as floor plan 700 or 800. For example, processor 310 may extract orientation information from the floor plan (e.g., based on compass 760 in FIG. 7B or 810 in FIG. 8). Based on the orientation information, processor 310 may determine the orientation of the target accessory structure. For example, referring to FIG. 8, floor plan 800 may include a compass 810 indicating the north direction. Processor 310 may extract this information, and determine that the orientation of balcony A is facing east based on the compass. Then, processor 310 may determine the orientation of the sitting room to which balcony A is attached. In this case, the orientation of the sitting room is also facing east. In this way, the orientation of a functional space can be determined based on the orientation of the accessory structure attached to the functional space. In some embodiment, multiple target accessory structures may attach to a functional space and may face different directions. In this case, such a functional space may have different orientations. For example, a living room having a window facing east and a balcony facing south may be considered as facing both east and south.

In some embodiments, processor 310 may determine a display mode corresponding to a particular type of feature information and control the display device to display the feature information according to the display mode. For example, a mapping relationship may be established between a particular type of feature information and a display mode. Referring to FIG. 4, the display mode corresponding to the type of the functional space, the square footage, accessory structure, and orientation may be a rectangular box on the surface of a wall. The display mode corresponding to the dimensions of the functional space may be an arrowed line with an attached rectangular information box. The display mode corresponding to the connectivity information may be a floating box showing the connected functional space with an arrow pointing to the connected functional space. The correspondence between the types of the feature information and the display modes may be used to rapidly render the feature information.

In some embodiments, processor 310 may control display device 322 to display feature information by overlaying the feature information on a surface of the 3D mode. For example, FIG. 4 shows that feature information 410 is overlaid on the surface of a wall, and feature information 460 is overlaid on the surface of an appliance. In some embodiments, a display region may be determined on a surface of a structure in the 3D model. Feature information may then be displayed in this display region to create an overlaying visual effect. Display feature information in this manner can provide an intuitive way to inform the user contextual information of the real estate property.

In some embodiments, other enrichment information, such as audio/video guides, may also be accessible on the same user interface displaying the feature information. For example, a button indicating an audio guide and/or a video guide may be provided to the VR environment shown in FIG. 4.

In some embodiment, when a user selects a displayed feature information, the displayed VR environment may be changed accordingly. For example, in FIG. 4, when a user clicks feature information 460 (showing "Kitchen >"), the displayed VR environment may be changed to the kitchen view. Similarly, when the user clicks feature information 450 (showing "Storage ^), the displayed VR environment may be changed to the inside view of the storage room. In this way, the feature information not only provides contextual information, but also provides an intuitive way to allow user interactions.

In some embodiments, a compass may be displayed in the 3D model to show geographical directions. The pointing directions of the compass may be determined based on the compass in the corresponding floor plan. For example, the pointing directions may be obtained by converting the directions of the compass in the floor plan using a dimensional conversion matrix, as discussed above.

Figure 11:
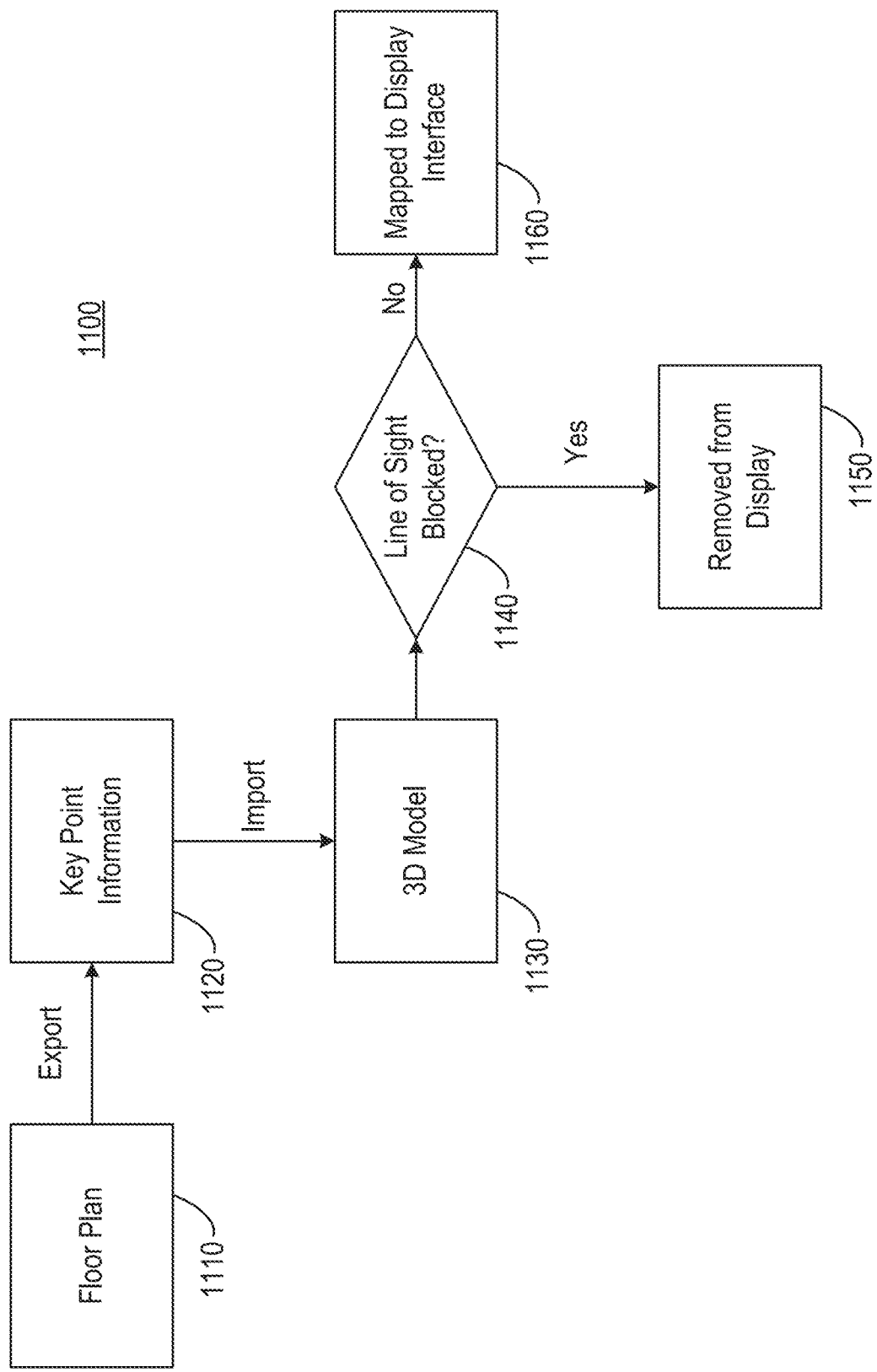
FIG. 11 illustrates an exemplary workflow of displaying feature information, according to embodiments of the disclosure.

FIG. 11 illustrates an exemplary workflow 1100 of displaying feature information, in accordance with some embodiments. Workflow 1100 may start from exporting key point information 1120 from floor plan 1110. The key point information may include the following:

(1) the position (e.g., coordinates) of a door, for example, the center point of the door, as well as connectivity information of the door (e.g., connecting bedroom and living room);

(2) square footage of a room, name or type of the room, etc.;

(3) accessory structure(s) of a room, such as a bathroom, balcony, closet, etc. that is connected to the room via a door or other structures:

(4) the orientation of a room, when the room has an attached window, balcony, terrace, garden, etc. that faces outside, then the orientation of these attached accessory structures can be used as the orientation of the room; and/or (5) the starting and ending coordinates of a wall.

The key point information may be imported to a 3D model 1130. For example, scalar information of the key point information can be directly imported into the 3D model, while vector information of the key point information can be converted using a dimensional conversion matrix and then imported into the 3D model, as discussed above. After the key point information is imported, line of sight testing 1140 can be performed with respect to a virtual observer to determine if any portion of the 3D model is visible or invisible to the virtual observer. If the line of sight is not blocked, then the portion of the 3D model is mapped to a display interface (e.g., display 322) for displaying to a user, as shown in block 1160. On the other hand, if the line of sight is blocked, then the portion of the 3D model is removed from display, as shown in block 1150.

In some embodiments, the mapping relationship between a floor plan and a 3D model can be established by first reducing the dimensions of the 3D model to a 2D plane (e.g., an x-y or x-z plane) and then mapping the points in the floor plan to the 2D plane or vice versa. In addition, key coordinates of the floor plan, such as the center point of a door, terminal points of a wall, the normal direction of a window, etc., can be mapped to the 2D plane. The line of sight detection method discussed above can determine the visible subset of the 3D model. For example, if the entrance of a room is within the FOV of a virtual observer, then the feature information of the room (e.g., function, square footage, ceiling height, etc.) may be dynamically displayed on the user interface.

Another aspect of the disclosure is directed to a non-transitory computer-readable medium storing instruction which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for displaying a three-dimensional (3D) model of a real estate property, comprising:
  a display device configured to display the 3D model;
  a memory storing computer-readable instructions; and
  at least one processor communicatively coupled to the display device and the memory, wherein the computer-readable instructions, when executed by the at least one processor, cause the at least one processor to perform operations comprising:
    determining a field of view (FOV) of a virtual observer of the 3D model based on a view point of the virtual observer in the 3D model, the FOV covering a subset of the 3D model;
    determining, based on a floor plan corresponding to the 3D model, feature information of a functional space, wherein the functional space at least partially falls within the FOV or connects to the subset of the 3D model covered by the FOV and the feature information comprises a type of accessory structure;
    identifying an accessory structure based on the type of accessory structure;
    determining whether the identified accessory structure is a target accessory structure;
    in response to a determination that the accessory structure is a target accessory structure, determining an orientation of the accessory structure based on the floor plan, the orientation of the accessory structure indicating a direction to which the accessory structure faces;
    determining an orientation of the functional space based on the orientation of the accessory structure, the orientation of the functional space indicating one or more directions to which one or more accessory structures attached to the functional space respectively face; and
    controlling the display device to display the subset of the 3D model along with the feature information.

2. The system of claim 1, wherein determining the FOV comprises:
  determining the FOV based on at least one of a location of the view point or a direction of observation of the virtual observer located at the view point.

3. The system of claim 1, wherein the operations comprise:
  determining whether a line of sight connecting a point of interest (POI) in the 3D model and the view point passes through a structural component of the 3D model;
  when the line of sight does not pass through any structural component, determining that the POI is within the FOV; and
  when the line of sight passes through at least one structural component, determining that the POI is outside the FOV.

4. The system of claim 1, wherein the feature information comprises at least one of a type of the functional space, dimension information of the functional space, orientation information of the functional space, accessory structure information of the functional space, or connectivity information of the functional space.

5. The system of claim 1, wherein determining the feature information comprises:
  mapping the FOV to the floor plan to obtain an observable region of the floor plan corresponding to the FOV;
  extracting information corresponding to the functional space from the floor plan based on the observable region; and
  determining, based on the extracted information, the feature information of the functional space.

6. The system of claim 5, wherein:
  the extracted information comprises scalar information; and
  the operations comprise:
    determining the feature information based on the scalar information.

7. The system of claim 5, wherein:
  the extracted information comprises vector information; and
  the operations comprise:
    converting the vector information to align with the 3D model; and
    determining the feature information based on the converted vector information.

8. The system of claim 1, wherein the operations comprise:
  determining a display mode corresponding to the feature information; and
  controlling the display device to display the feature information according to the display mode.

9. The system of claim 1, wherein the operations comprise:
  controlling the display device to display the feature information by overlaying the feature information on a surface of the 3D model.

10. A method for displaying a three-dimensional (3D) model of a real estate property, the method comprising:
  determining, by at least one processor, a field of view (FOV) of a virtual observer of the 3D model based on a view point of the virtual observer in the 3D model, the FOV covering a subset of the 3D model;
  determining, by the at least one processor, feature information of a functional space based on a floor plan corresponding to the 3D model, wherein the functional space at least partially falls within the FOV or connects to the subset of the 3D model covered by the FOV and the feature information comprises a type of accessory structure; identifying an accessory structure based on the type of accessory structure;
  determining whether the identified accessory structure is a target accessory structure;
  in response to a determination that the accessory structure is a target accessory structure, determining an orientation of the accessory structure based on the floor plan, the orientation of the accessory structure indicating a direction to which the accessory structure faces;

determining an orientation of the functional space based on the orientation of the accessory structure, the orientation of the functional space indicating one or more directions to which one or more accessory structures attached to the functional space respectively face; and displaying, by a display device communicatively coupled to the at least one processor, the subset of the 3D model along with the feature information.

11. The method of claim 10, wherein determining the FOV comprises:

determining the FOV based on at least one of a location of the view point or a direction of observation of the virtual observer located at the view point.

12. The method of claim 10, further comprising:

determining whether a line of sight connecting a point of interest (POI) in the 3D model and the view point passes through a structural component of the 3D model;

when the line of sight does not pass through any structural component, determining that the POI is within the FOV; and when the line of sight passes through at least one structural component, determining that the POI is outside the FOV.

13. The method of claim 10, wherein the feature information comprises at least one of a type of the functional space, dimension information of the functional space, orientation information of the functional space, accessory structure information of the functional space, or connectivity information of the functional space.

14. The method of claim 10, wherein determining the feature information comprises:

mapping the FOV to the floor plan to obtain an observable region of the floor plan corresponding to the FOV;

extracting information corresponding to the functional space from the floor plan based on the observable region; and determining, based on the extracted information, the feature information of the functional space.

15. The method of claim 14, wherein:

the extracted information comprises scalar information; and the method comprises:

determining the feature information based on the scalar information.

16. The method of claim 14, wherein:

the extracted information comprises vector information; and the method comprises:

converting the vector information to align with the 3D model; and determining the feature information based on the converted vector information.

17. The method of claim 10, further comprising:

determining a display mode corresponding to the feature information; and displaying the feature information according to the display mode.

18. A non-transitory computer-readable medium storing computer-readable instructions, wherein the computer-readable instructions, when executed by at least one processor, cause the at least one processor to perform a method for displaying a three-dimensional (3D) model of a real estate property, the method comprising:

determining a field of view (FOV) of a virtual observer of the 3D model based on a view point of the virtual observer in the 3D model, the FOV covering a subset of the 3D model;

determining feature information of a functional space based on a floor plan corresponding to the 3D model, wherein the functional space at least partially falls within the FOV or connects to the subset of the 3D model covered by the FOV and the feature information comprises a type of accessory structure; identifying an accessory structure based on the type of accessory structure;

determining whether the identified accessory structure is a target accessory structure;

in response to a determination that the accessory structure is a target accessory structure, determining an orientation of the accessory structure based on the floor plan, the orientation of the accessory structure indicating a direction to which the accessory structure faces;

determining an orientation of the functional space based on the orientation of the accessory structure, the orientation of the functional space indicating one or more directions to which one or more accessory structures attached to the functional space respectively face; and controlling a display device to display the subset of the 3D model along with the feature information.

* * * * *